United States Patent [19]

Fowler et al.

[11] Patent Number: 5,721,728
[45] Date of Patent: Feb. 24, 1998

[54] NETWORK NODE TESTING METHOD AND APPARATUS

[75] Inventors: Jerry Neil Fowler, Joliet; Charles Conrad Hemesath, Hinckley, both of Ill.

[73] Assignee: Lucent Technologies Inc., Murray Hill, N.J.

[21] Appl. No.: 576,420

[22] Filed: Dec. 21, 1995

[51] Int. Cl.$^6$ .................. H04J 3/12; H04J 3/24
[52] U.S. Cl. .......... 370/250; 370/410; 370/426; 370/474; 395/200.12
[58] Field of Search .................. 370/250, 251, 370/252, 253, 395, 396, 400, 401, 410, 426, 469, 474, 522, 524, 903, 904; 395/200.02, 200.12

[56] References Cited

U.S. PATENT DOCUMENTS

| | | | |
|---|---|---|---|
| 5,077,554 | 12/1991 | Orita et al. | 340/825.02 |
| 5,268,895 | 12/1993 | Topper | 370/385 |
| 5,278,823 | 1/1994 | Handel | 370/249 |
| 5,289,179 | 2/1994 | Beeson, Jr. et al. | 340/826 |
| 5,309,501 | 5/1994 | Kozik et al. | 379/58 |
| 5,394,540 | 2/1995 | Barrington et al. | 395/500 |
| 5,396,543 | 3/1995 | Beeson, Jr. et al. | 379/59 |
| 5,539,884 | 7/1996 | Robrock, II | 395/200.12 |
| 5,553,058 | 9/1996 | Glitho | 370/250 |
| 5,574,724 | 11/1996 | Bales et al. | 370/410 |

OTHER PUBLICATIONS

International Telegraph and Telephone Consultative Committee CCITT, 1989–1992, Report of the Final Meeting Held in Geneva From 9 to 20 Mar. 1992 Part II.11 Revised Recommendation Q.714.

*Primary Examiner*—Alpus H. Hsu

[57] ABSTRACT

Disclosed is a method and apparatus for testing segmentation and reassembly functionalities of a communication network signalling node. A test signal is provided to a message transfer part ("MTP") of a signalling node. The test signal includes a first user portion, and the first user portion includes test parameters. The MTP and a connected signaling connection control part ("SCCP") then process the test signal and provide the first user portion to an application layer of signaling node. After receiving the first user portion, the application layer generates a second user portion based on the test parameters. The second user portion is then provided to an SCCP to be tested. The SCCP to be tested the performs segmentation operation on the second user portion, thereby creating a plurality of test signal segments. The plurality of the test signal segments are then provided to a second node that is operable to provide test results indicative of the integrity of the segmentation operation based on the test signal segments.

20 Claims, 5 Drawing Sheets

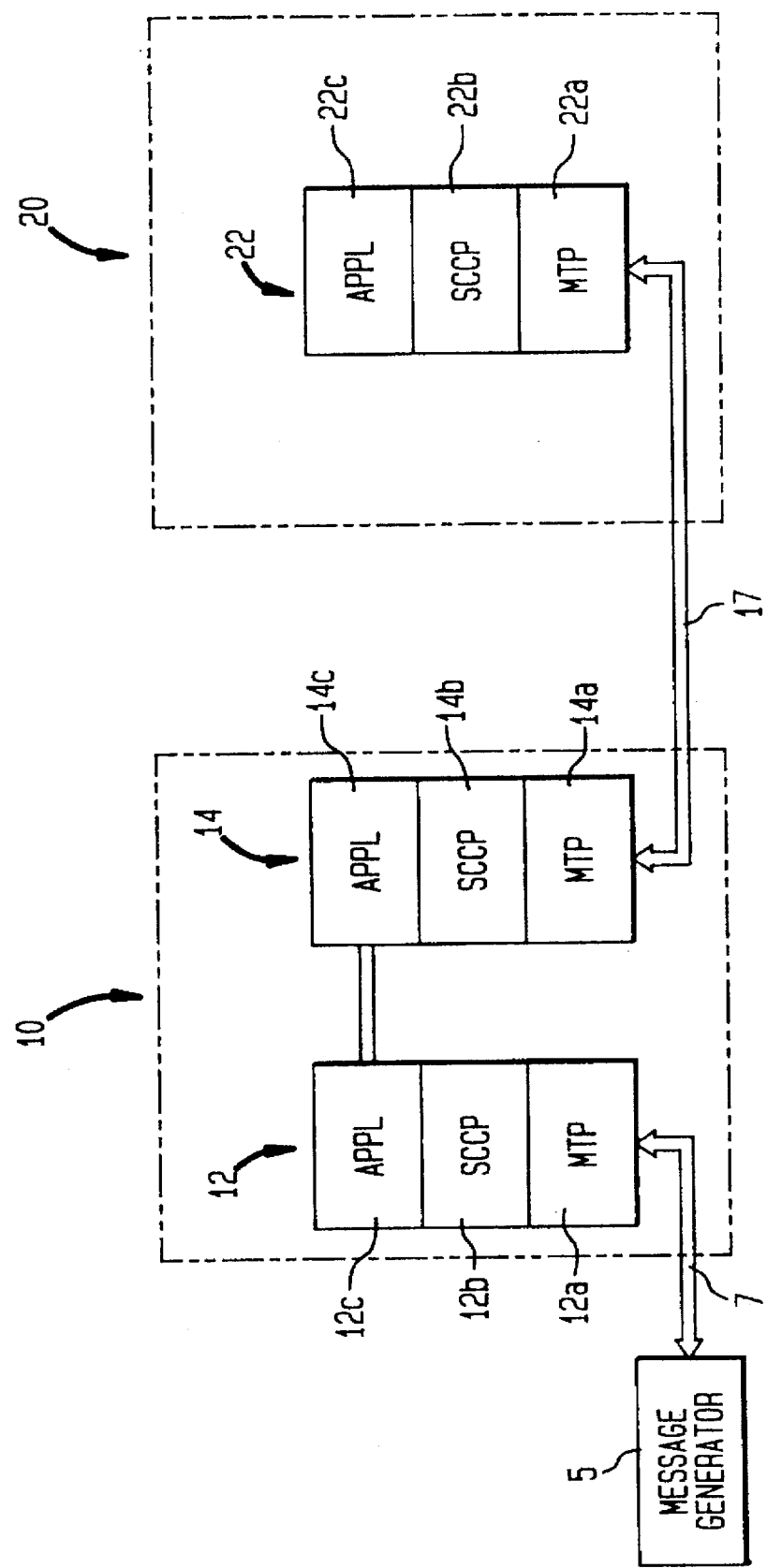

NETWORK NODE TESTING METHOD AND APPARATUS

FIELD OF THE INVENTION

This invention relates generally to digital communications networks, and more particularly, to testing of digital communications networks.

BACKGROUND OF THE INVENTION

Large scale digital communication networks preferably employ a universal signaling protocol that allows the systems and nodes of several manufacturers to operate together. One such signaling protocol is the Signaling System Number 7, which is defined in part by the CCITT Recommendations Q.711 through Q.714. A signaling node or system designed to operate in accordance with CCITT Recommendations Q.711 through Q.714 typically includes one or more protocol handlers. Each protocol handler is further comprised of functional elements including a message transfer part ("MTP"), a signal connection control part ("SCCP") and an application layer.

In general, the protocol handlers of such signaling nodes facilitate the communication of digital signals or messages throughout the network. The components of a protocol handler operate in the following manner. The MTP serves as a transport system for messages passing into and out of the signaling node. In particular, the MTP is responsible for providing physical links, data link control functions, and low level message routing. The SCCP is situated between the application layer and the MTP and provides internetworking functions to support both connectionless and connection-oriented network services between nodes. For example, the SCCP performs high level message routing, sometimes referred to as logical routing. These and other specifications for the operation of the SCCP may be found in CCITT Recommendation Q.714.

The application layer may be any number of service provider applications that operate within the network. For example, the application layer may include network management software that monitors the operations of the network and provides usage and test data to network managers. Alternatively, the application layer may include a data base, such as a credit card data base that is accessed over the network to validate credit card purchases. Such a system is described for example, in U.S. Pat. No. 5,278,823 which is assigned to the assignee of the present invention and incorporated herein by reference.

According to the CCITT Recommendations, the application layer of a signaling node should have the capability to transmit blocks of data over the network. Such blocks of data, however, may be larger than the message portion or user portion of a defined standard unit data transport ("UDT") message. Accordingly, the Signaling System No. 7 standard includes a requirement that SCCPs in compatible signaling nodes be capable of segmenting large data blocks and subsequently reassembling the segmented data blocks. In particular, the CCITT Recommendations require that an SCCP be capable of segmenting a 2 kilobyte block of data into a series of standard extended unit data transport ("XUDT") messages. The standard XUDT messages may then be provided over the network to another signaling node where the data block is reassembled. Accordingly, an SCCP is also required to be capable of both segmentation and reassembly.

Both Recommendation Q.714 and its implementations are still evolving, and as a result, suitable facilities for testing for compliance with certain aspects of the Recommendation are not presently known. In particular, no known testing facility adequately tests the segmentation and reassembly functionality of SCCPs. Implementation of the segmentation and reassembly capabilities will be hampered until a suitable testing method is developed. Consequently, there is a need for a method of testing nodes in a digital communication network that utilize an SCCP for segmentation and reassembly.

SUMMARY OF THE INVENTION

The present invention achieves this and other needs by providing a method and apparatus for testing segmentation and reassembly in one or more communications network signaling nodes through the application of an external test signal. The external test signal has a standard message structure, for example, a UDT message, and contains within its user portion test parameters that are used by a suitably programmed application layer to carry out the segmentation and reassembly tests.

According to one method of the present invention, a test signal is provided to an MTP of a signaling node, with the test signal including a first user portion, and the first user portion including test parameters. The MTP and a connected SCCP then provide the first user portion of the test signal to an application layer of the signaling node. After receiving the first user portion, the application layer generates a second user portion based on the test parameters in the test signal. In a preferred embodiment, the second user portion includes a data block having a size of up to approximately 2 kilobytes. The second user portion is then provided to an SCCP to be tested. The SCCP to be tested then performs a segmentation operation to generate a plurality of test signal segments, each of the plurality of test signal segments comprising a user portion segment, such that the sum of the user portion segments includes the contents of the second user portion. Finally, the plurality of test signal segments are provided to a second node, the second node operable to provide test results indicative of the integrity of the segmentation operation based on the test signal segments. In a preferred embodiment, components of the second node reassemble the second user portion and perform tests to verify that data has not been corrupted in the segmentation and reassembly sequence.

The above features and advantages as well as other features and advantages will become readily apparent to those of ordinary skill in the art by reference to the following detailed description and accompanying drawings.

BRIEF DESCRIPTION OF THE DRAWINGS

FIG. 1 illustrates a digital communication network under testing conditions in accordance with the present invention;

DETAILED DESCRIPTION OF THE DRAWINGS

Figure 3:
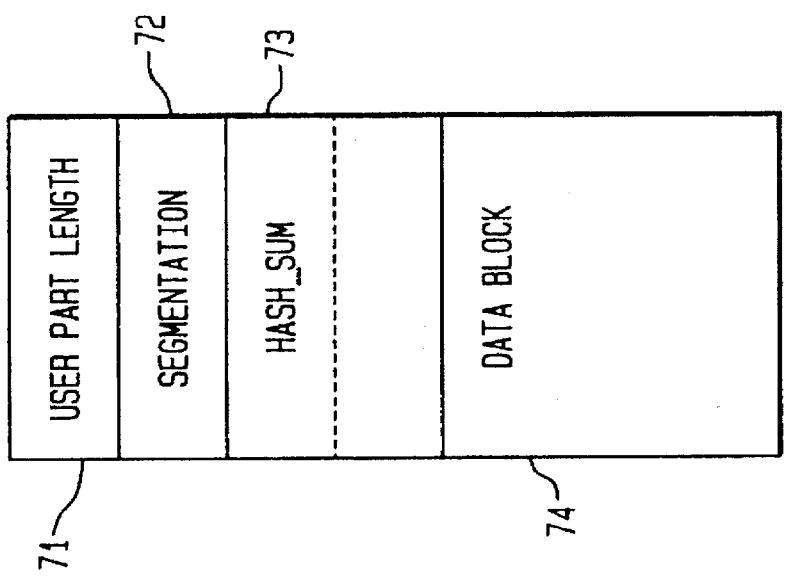
FIG. 3 illustrates a format of a second user portion that is used to test segmentation and reassembly in accordance with the present invention.

FIG. 1 illustrates a digital communication network that is configured for a testing procedure in accordance with the present invention. The network includes a message generator 5, a first signaling node 10, and a second signaling node 20. The message generator 5 may suitably be a Message Generator Traffic Simulator available from Tekelec, for example. The first signaling node 10 includes a plurality of protocol handlers, such as those illustrated by first and second protocol handlers 12 and 14. The second signaling node 20 includes at least one protocol handler, for example, a third protocol handler 22. Each of the protocol handlers 12, 14 and 22 is preferably a circuit operable to carry out the tasks defined by the CCITT Recommendations for Signaling System No. 7, including tasks defined for an MTP, an SCCP, and an application layer. For the purposes of describing the present invention, the first protocol handler 12 includes an MTP 12a, an SCCP 12b and an application layer 12c; the second protocol handler 14 includes an MTP 14a, an SCCP 14b, and an application layer 14c; and the third protocol handler 22 includes an MTP 22a, an SCCP 22b, and an application layer 22c. A signaling link 7 connects the message generator 5 to the MTP 12a. The application layer 12c is operably connected to the application layer 14c within the first signaling node 10. Another signaling link 17 connects the MTP 14a to the MTP 22a.

It is noted that the physical structure of the protocol handlers 12, 14 and 22 include one or more processors, memories and related circuitry which are necessary to enable the protocol handler to carry out the CCITT standard functions defined for the MTP, SCCP and application layer. Such detailed structure is known to those of ordinary skill in the art. Suitable protocol handlers include Message Delivery Protocol Handlers, and Quad-Pipe Protocol Handlers, which are available in a model 5ESS® digital switch available from AT&T Corporation. The general functionality of the MTPs, SCCPs and application layers of the protocol handlers 12, 14 and 22 are described below.

The MTPs 12a, 14a and 22a each carry out signal link controls and internode communication. In particular, each MTP 12a, 14a and 22a is essentially responsible for carrying out the physical layer communication of signals between the node in which it is located and an external node or entity. For example, in the test configuration in FIG. 1, the MTP 12a is responsible for the physical link communication of signals received from the message generator 5 over the signaling link 7. The details associated with the structure and operation of the MTPs 12a, 14a and 22a are known to those of ordinary skill in the art. The MTPs 12a, 14a and 22a may each suitably be a message transfer part of a protocol handler found within an AT&T model 5ESS® digital switch.

The SCCPs 12b, 14b and 22b carry out logical routing processing in accordance with the standards set forth with particularity in CCITT Recommendation Q.714. The details of structure and operation of the SCCPs 12b, 14b and 22b are known to those of ordinary skill in the art. For example, the SCCPs 12b, 14b and 22b may each suitably be an SCCP of a protocol handler found within an AT&T model 5ESS® digital switch.

Figure 1A:
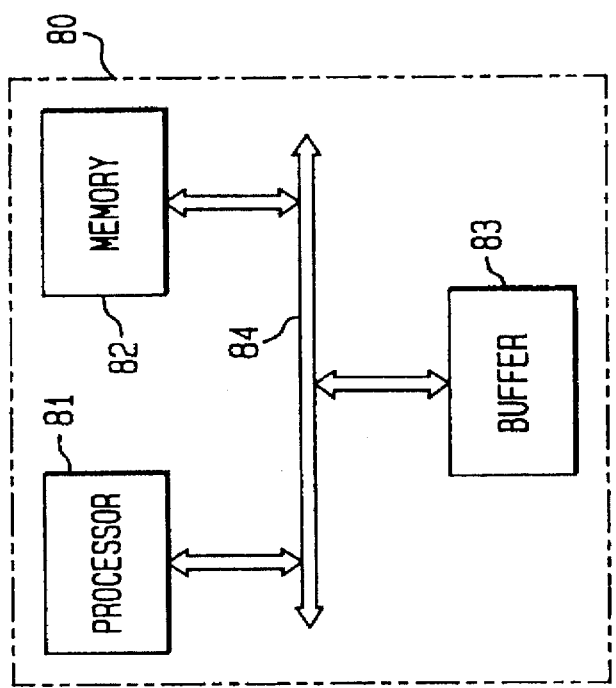
FIG. 1a illustrates an application layer circuit for use in a network node in accordance with the present invention.

The application layers 12c, 14c and 22c each include a processor that is operable to execute program instructions in order to perform the testing procedures of the present invention, which is described below. FIG. 1a illustrates an exemplary application layer 80 that includes a processor 81, a memory 82, and a buffer 83, all of which are connected by a bus 84. In operation, the processor 81 executes program instructions stored within the memory 82 to perform the operations described below in connection with the present invention. The buffer 83 temporarily stores data either received from or provided to external circuitry, not shown.

The bus 84 provides communication among and between the processor 81, the memory 82, the buffer 83 and any external circuitry (not shown) that may be operably connected to the bus 84.

In normal operation, the signaling nodes 10 and 20 operate to communicate signals with other nodes, not shown, that together form a network. The various components of each of the signaling nodes 10 and 20 operate in a known manner to effectuate such communications. The system illustrated in FIG. 1, however, is specifically configured for a testing operation which tests the segmentation functionality of the first protocol handler 14 and the reassembly functionality of the third protocol handler 22.

Figure 2B:
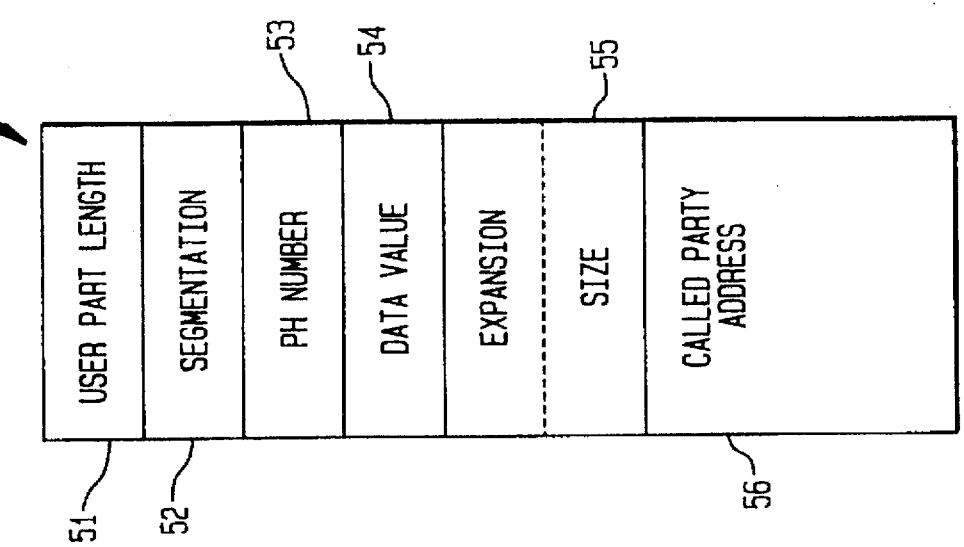
FIG. 2 illustrates a standard UDT message format.
FIG. 2a illustrates a format of a user portion of a UDT message in accordance with the present invention.

In a testing operation according to the present invention, the message generator 5 generates a unit data transfer ("UDT") test message signal as defined herein. FIG. 2 illustrates an exemplary UDT test message 30 that may be used in accordance with the present invention. The UDT test message 30 consists of an MTP routing label 31 and an SCCP portion 33. The MTP routing label 31 preferably has a data format that is compatible with the standard Signaling System No. 7 protocol, and further contains data values appropriate for routing a message to the proper application in the application layer 12c of the first node 10. The SCCP portion 33 suitably has a data format that is also compatible with the standard Signaling System No. 7 protocol. To this end, the SCCP portion 33 includes a message type byte 34, a called party address pointer 35, a calling party address pointer 36 and a user portion pointer 37. The SCCP portion 33 also includes the called party field 38 and the calling party field 39. The called party field 38 and the calling party field 39 identify, respectively, the logical address of the message's destination and the logical address of the point where the message originated. In the current embodiment, the called party field 38 identifies the logical address for the first signaling node 10, and in particular for the SCCP 12b located therein. The calling party field 39 identifies the logical address of the message generator 5. Those of ordinary skill in the art may readily determine the appropriate values for the above identified fields to suit their particular implementation.

Figure 2A:
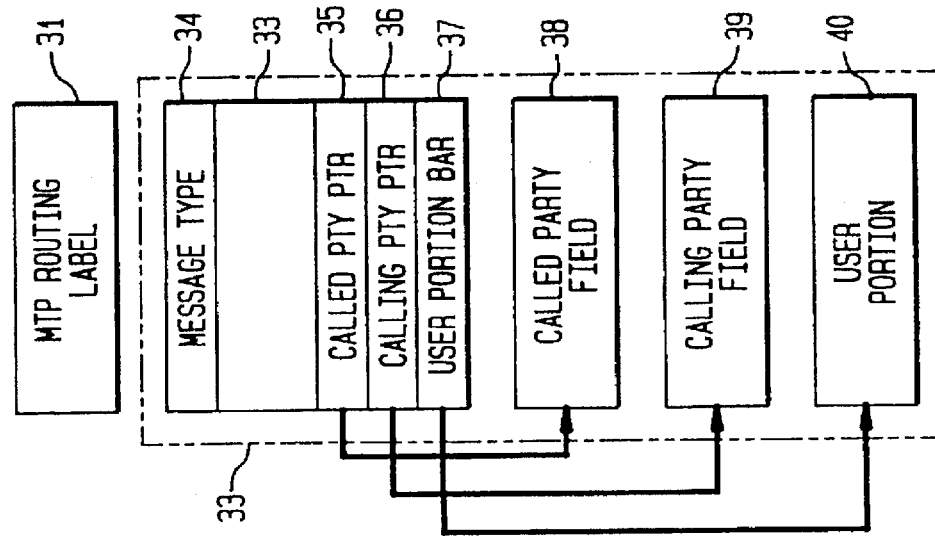

The SCCP portion 33 also includes a user portion 40. The user portion 40 generally has a data format compatible with the standard Signaling System No. 7 protocol, and further includes test parameters for use in the testing process according to the present invention. FIG. 2a shows in an exemplary data structure which may be used as the user portion 40 of the UDT message 30 of FIG. 2. The user portion 40 comprises a User Part Length Value 51, a Segmentation Flag 52, a PH Number Byte 53, a Data Value Byte 54, an Expansion Size 55, and a Called Party Address Block 56.

The User Part Length Value 51 is a value that identifies the length of the user portion 40 (not including the User Part Length Value 51 itself) and may readily be determined by those of ordinary skill in the art. The Segmentation Flag 52 is a value that is initially set equal to zero, which signifies that the segmentation part of the testing process has not been completed. The PH Number Byte 53 is a value that identifies a protocol handler in which the segmentation functionality will be tested. In the present embodiment, the PH Number Byte 53 contains a value that identifies the second protocol handler 14. In other tests, the PH Number Byte may identify other protocol handlers to be tested. The Data Value Byte 54 is a data value that will be used as filler data for a test data block. The test data block is discussed further below, but in general is a data block that is generated and provided to the protocol handler to be tested. The value of the Data Value Byte 54 is a matter of design choice and will vary from test to test. The Expansion Size 55 identifies the size of the test data block. According to the CCITT Recommendations Q714, the protocol handler under test should be able to segment a data block of up to 2 kilobytes. Accordingly, the Expansion Size 55 may suitably be a value up to approximately 2 kilobytes. The Called Party Address Block 56 identifies the logical address of another SCCP involved in the test, and in particular, the SCCP that is responsible for reassembling the test data block. In the present embodiment, the value of the Called Party Address Block 56 identifies the SCCP 22b of the second signaling node 20.

The message generator 5 stores the UDT test message 30 described above within a temporary storage device, such as a buffer, not shown, that is located within the message generator 5. The message generator 5 then sends the test message 30 over the signaling link 7 to the MTP 12a of the first protocol handler 12. Upon receiving the UDT test message 30, the MTP 12a may temporarily store the test message in a buffer, not shown, located in the protocol handler 12. In any event, the MTP 12a reads and processes information in the MTP routing label 31 as is known in the art. The MTP 12a then passes the SCCP portion 33 to the SCCP 12b. The SCCP 12b then reads and processes the information in the SCCP portion 33 as is known in the art. In general, the MTP 12a and SCCP 12b utilize the information in the MTP routing label and SCCP portion 33 in part to route the user portion 40 to the application layer 12c, and furthermore, to cause the application layer to execute a software program associated with a segmentation/reassembly test. Suitable routing procedures are known to those of ordinary skill in the art. Accordingly, the SCCP 12b passes the user portion 40, including the test parameters located therein, to the application layer 12c.

The application layer 12c then, using one or more of the test parameters, begins the execution of a segmentation/reassembly test program. In particular, the application layer 12c first determines whether segmentation must be performed by retrieving the Segmentation Flag 52. At this point, the Segmentation Flag 52 is set to false, which indicates to the application layer 12c that segmentation has not yet been performed, or in other words, the test is just starting. The application layer 12c then identifies the protocol handler to be tested by retrieving the PH Number Byte 53. Because the PH Number Byte 53 in this exemplary operation contains a value identifying that the second protocol handler 14, the application layer 12c provides the user portion 40 in the form of a inter-protocol handler packet, or ph—ph packet, to the second protocol handler 14. However, the application layer 12c first reverses the Segmentation Flag 52.

The application layer 14c of the second protocol handler 14 receives the ph—ph packet including the user portion 40. The application layer 14c then generates a second user portion based on the test parameters. In particular, the application layer 14c generates the second user portion for the purpose of testing the segmentation functionality of the SCCP 14b of the second protocol handler 14. To this end, the size of second user portion exceeds the permissible capacity of a UDT message user portion. For example, the application layer 14c may generate a second user portion that consists of up to 2 kilobytes of data. A 2 kilobyte second user portion must be segmented by the SCCP 14b before it can be transmitted using UDT-type messages. In any event, the application layer 14c generates a second user portion having a structure generally as identified in FIG. 3. FIG. 3 shows an exemplary data structure that may comprise a second user portion 70 of a test message. The second user portion 70 includes a User Part Length Value 71, the Segmentation Flag 52, a Hash_Sum Value 73 and a Data Block 74. The User Part Length Value 71, like the User Part Length 51, identifies the length of the second user portion 70 not including User Part Length Value 71.

To generate the second user portion 70, the application layer 14c inserts the reversed Segmentation Flag 52 of the user portion 40 into the second user portion 70. The application layer 14c then generates the Data Block 74 which is a data block of essentially filler data (or stuffing). The Data Block 74 consists of a quantity of data such that the combination of the Data Block 74, the Segmentation Flag 52 and the Hash_Sum Value 73 comprise a quantity of data specified by the Expansion Size 55. Each byte of stuffing in the generated Data Block 74 preferably has an identical value which is specified by the Data Value 54. Finally, the application layer determines the Hash_Sum Value 73 by performing a predetermined set of operations on the Data Block 74. The Hash_Sum Value 73 is a verification value which identifies a measurable quality about the data block. In a preferred embodiment, the verification value is a hash sum of the data in the Data Block 74. Hash sum determination algorithms are well known in the art. In any event, the Hash_Sum Value 73 is set equal to the verification value.

The application layer 14c then passes the second user portion 70 to the SCCP 14b of the second protocol handler 14. The SCCP 14b, in turn, performs segmentation on the second user portion 70 to generate a plurality of user portion segments. In other words, the SCCP 14b divides the user portion 70 into several similarly sized blocks, such that the sum of the data in all of the user portion segments comprises all of the data in the second user portion 70. The size of the user portion segments is preferably consistent with the maximum user portion size defined for an XUDT message. The SCCP 14b then adds the remainder of the SCCP portion to each of the user part segments, resulting in a plurality of SCCP portions having a structure consistent with the SCCP portion 33 of FIG. 3. To this end, each called party field 38 is filled with the contents of Called Party Address Block 56 from the first user part 40 of FIG. 2a, and each calling party field 39 is filled with the contents of the original message's called party field 38. The MTP 14a then adds MTP routing labels to each of the resulting SCCP portions to form a plurality of test signal segments preferably having an XUDT message structure in accordance with the CCITT Recommendation Q714. The MTP 14a provides the resulting test signal segments over the signaling link 17 to the second node 20.

The MTP 22a of the second node 20 receives the test signal segments, reads and processes them, and provides the test signal segments without their MTP routing labels to the SCCP 22b. The SCCP 22b then, among other things, performs a reassembly procedure in accordance with the CCITT Recommendation Q714. In particular, the SCCP 22b generates a reassembled second user portion from the user portion segments. The SCCP 22b then provides the reassembled second user portion to the application layer 22c, which verifies that the segmentation and reassembly procedures were successful. The reassembled second user portion preferably has the same structure as the second user portion 70.

To verify the segmentation and reassembly procedures, the application layer 22c first retrieves the Segmentation Flag 52 from the reassembled second user portion, which identifies that the segmentation has already been completed.

The application layer 22c then recalculates the verification value using the reassembled Data Block 74 and compares the value to the Hash_Sum Value 73 passed within the reassembled second user portion. If the two values are equal, the segmentation reassembly process was successful. The application layer 22c then provides the test results to an attached printer or a data file, not shown.

The present invention thus provides a novel testing procedure and data structure for use therewith that allows segmentation/reassembly procedures to be tested through application of an external UDT test message, in accordance with CCITT Recommendations Q711–Q714. Such tests are used to verify the operation of several node elements, particularly the MTPs and SCCPs involved in the test. The use of a test message provided from an external source such as the message generator 5 of FIG. 1 allows for the remote testing of signaling nodes as well as the bundling of the segmentation and reassembly tests with other CCITT testing procedures.

It will be noted that changes in the test configuration may be accommodated by changing the test parameters. For example, the segmentation functionality of a protocol handler other than the second protocol handler 14 may be tested by changing the PH Number 53 so that the Number 53 identifies such other protocol handler. Likewise, the reassembly functionality of a protocol handler other than third protocol handler 22 may be tested by changing the Called Party Address Block 56 accordingly.

The test procedure of the present invention would be useful, for example, before attempting to download a data base from a signaling node. In the future, signaling nodes such as the first signaling node 10 of FIG. 1 may be called upon to download large amounts of data from data bases through a network such as the network illustrated in FIG. 1. In such a case, the downloading node would presumably utilize the SCCP segmentation procedure to segment large blocks of data from the data base to enable the data to be transferred within XUDT messages throughout the network. The testing procedures according to the present invention may be advantageously utilized to test the integrity of the segmentation/reassembly process and the data link between the segmentation (or origination) node and the reassembly (or receiving) node before the download is attempted.

In a preferred implementation of the present invention, an application layer should be operable to perform any portion of the segmentation/reassembly test process, and should be programmed accordingly. As illustrated by the description of FIG. 1, the testing process according to the present invention involves operations by three application layers, each performing a portion of the test process. The first application layer, as exemplified by the application layer 12c of FIG. 1, receives the first user portion and identifies the protocol handler to be tested. The second application layer, as exemplified by the application layer 14c, is located in the protocol handler under test, and is responsible for creating the second user portion including the segmentation data block. The third application layer, such as the one exemplified by application layer 22c, is responsible for receiving the second user portion after it has been segmented and reassembled and for evaluating whether the procedure was properly executed. Optimally, each application layer in a particular communication system is programmed so that it may perform any of these functions.

Figure 4A:
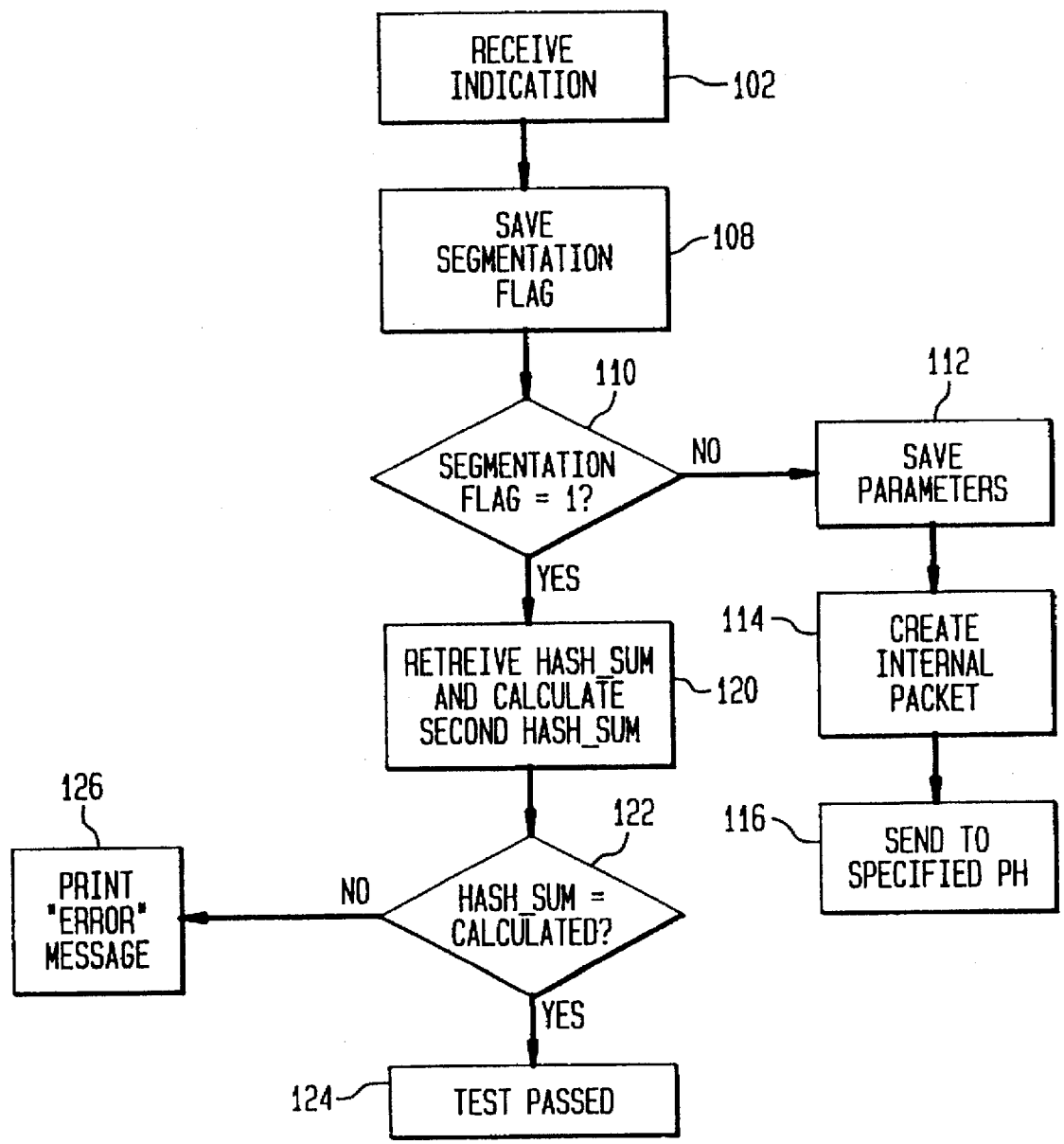
FIGS. 4a and 4b illustrate a flow diagram of the operations performed by the application layer in order to carry out test procedures according to the present invention.
Figure 4B:
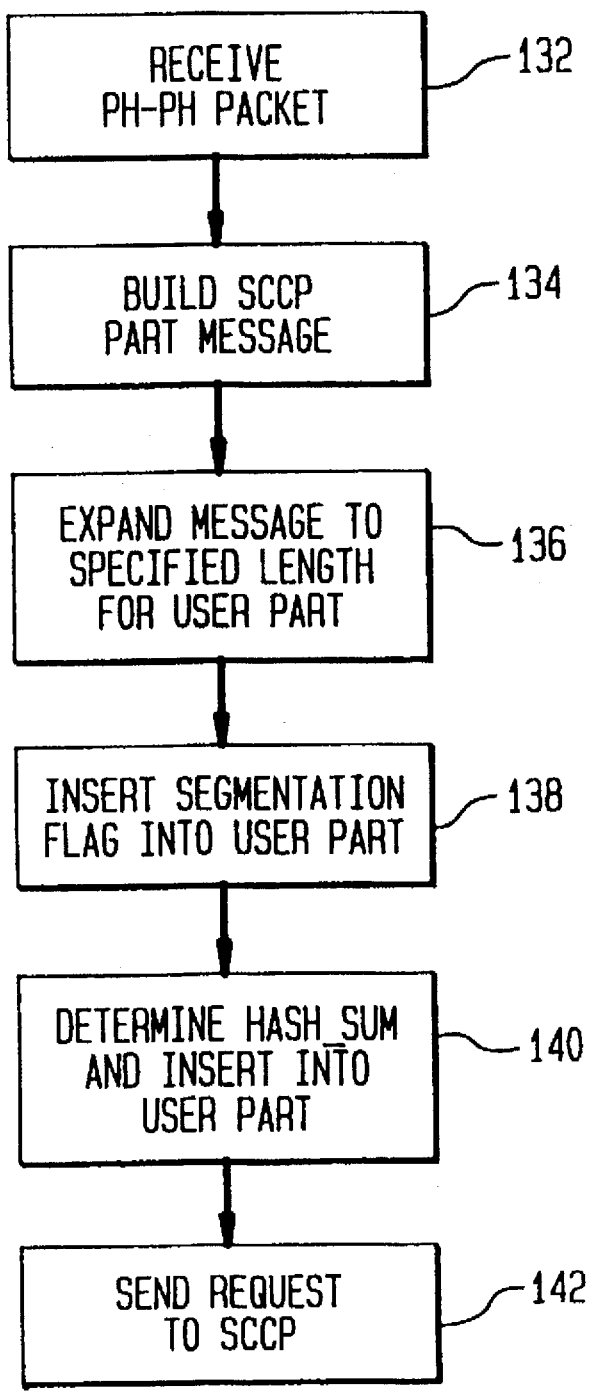

FIGS. 4a and 4b illustrate two flow diagrams that represent the steps performed by an application layer operating according to the present invention. More paticularly, FIGS. 4a and 4b illustrate a flow diagram representative of the operations performed by a processor performing the functions of the application layer, such as the processor 81 of application layer 12c of FIG. 1, of a protocol handler in a signaling node. An application layer processor, or simply application processor, that is programmed to execute the operations illustrated in FIGS. 4a and 4b may suitably be used to carry out any portion of the segmentation/ reassembly test process. However, because each application layer typically performs only one portion of the test process for a particular test, each application processor only executes a portion of the flow diagram in FIGS. 4a and 4b during the course of a particular test.

The portion of the flow diagram in FIGS. 4a and 4b executed by an application processor depends upon the type of message received by the application processor. In general, it is noted that the application processor receives messages from either an SCCP or another application layer. A message structure used to pass information from an SCCP to an application layer is known as an indication. For example, in the configuration described above in connection with FIG. 1, the application processors in application layers 12c and 22c receive indications from the SCCPs 12b and 22b, respectively. In contrast, a ph—ph packet is a message structure used to pass messages from one application processor to another. For example, the application processor in the application layer 14c of FIG. 1 receives a ph—ph packet from layer 12c. In any event, an application processor operating according to the present invention will execute different portions of its programming code depending upon what type of message it receives. FIG. 4a illustrates the operations performed when the application layer receives an indication from an SCCP while FIG. 4b illustrates the operations performed when the application processor receives a ph—ph message from another application layer.

Referring now to FIG. 4a, the application processor first, in step 102, receives an indication from the SCCP of the protocol handler on which the application processor resides. The indication has a message structure that contains pointers to the contents of a UDT or XUDT message that is stored in a memory structure in the protocol handler. In particular, an indication according to the present invention includes a pointer to each of the memory addresses in which the user portion 40 (or second user portion 70), the calling party field 38 and the called party field 39 from a UDT-type message are stored. After step 102, the application layer processor proceeds to execute step 108. In step 108, the application processor retrieves from the user portion the segmentation flag byte and stores the byte locally. According to the present embodiment, it is assumed that the user portion has a data structure defined by either the user portion 40 of FIG. 2a or the second user portion 70 of FIG. 3, and therefore, for example the application processor would retrieve and store the Segmentation Flag 52. It is to be understood, however, that other user portion structures may be employed that contain test parameters for carrying out the testing procedure according to the present invention.

The application processor then, in step 110, reads the Segmentation Flag 52 to determine whether segmentation has already occurred. For example, consider the exemplary operation of the application layer 12c described above in connection with FIG. 1. In that operation, because segmentation has not yet been performed, the Segmentation Flag 52 would be set equal to zero or false. However, when the test message or messages are later received and processed by the application layer 22c in the second signaling node 20, segmentation (and reassembly) has already occurred, and the Segmentation Flag 52 would be set equal to one or true.

Accordingly, if in step 110, it is determined that the Segmentation Flag 52 is set equal to true, then the testing procedure is essentially complete and the application layer proceeds to execute step 120 to begin evaluating the test results. The evaluation of the test results (steps 120, 122, 124 and 126) will be discussed further below. If, however, in step 110, it is determined that the Segmentation Flag 52 is set equal to false, then the application layer proceeds to step 112 to continue with the testing procedure.

In step 112, the application processor uses the pointers provided by the indication to retrieve and store the remaining test parameters in the SCCP user portion data. Because segmentation has not occurred, the user portion pointed to in the received indication will have the structure of the user portion 40 from FIG. 2a. Accordingly, the application processor retrieves and stores data from the user portion 40. To this end, the application processor stores locally the PH Number 53, the Data Value 54, the Expansion Size Block 55 and the Called Party Address 56. The application layer further reverses or toggles the value of the Segmentation Flag 52 to true, and then stores it. In a preferred embodiment, the application processor further retrieves the called party field 38 from the SCCP portion 33. The called party information is used for determining routing information utilized in subsequent steps. Thereafter, in step 114, the application layer creates a ph—ph packet, which contains the test parameters (from the user portion 40) and the called party field 38. Once the ph—ph packet is generated, the application processor in step 116 sends the ph—ph packet to another protocol handler, which is identified in the PH Number 53 of the user portion 40. After step 116, the operations of the application processor in connection with the received indication are completed.

Referring again to step 110, if segmentation has already occurred, then the indication will contain pointers to a reassembled user portion. According to the present embodiment, the reassembled user portion has the structure defined by the second user portion 70 of FIG. 3. Thus, in step 110, when the application layer retrieves the segmentation flag, it retrieves the Segmentation Flag 52 of the reassembled second user portion. If the Segmentation Flag 52 is true, then the application processor proceeds to step 120. In step 120, the application processor retrieves a verification value, for example, the Hash_Sum Value 73, from the reassembled user portion, which is used to determine if the segmentation/reassembly process was properly executed. The segmentation/reassembly process is considered successful if it can be determined with some degree of confidence that none of the data in the second user portion 70 was corrupted in the segmentation, transmission and reassembly process. To obtain this degree of confidence, the application processor retrieves the Hash_Sum Value 73 from the reassembled second user portion and independently calculates a second hash sum value. The method used to calculate the hash sum may be of any suitable type well known in the art but must be consistent with the method used to determine the Hash_Sum Value 73.

In step 122, the second hash sum value is compared to the Hash_Sum Value 73 from the user portion 70. If in step 122, the second hash sum value is equal to the Hash_Sum Value 73, then the segmentation/reassembly procedure was successful and the application processor executes step 124. In step 124, a "pass" message or similar message may be sent to a printer or disk, not shown. If, however, the answer in step 122 is no, then the segmentation/reassembly procedure was unsuccessful and a "fail" message is sent to a printer or disk in step 126. It may be preferable to print only the "fail" messages, and not the "pass" messages, in order to reduce delays in the execution of repeated tests.

FIG. 4b illustrates the operations of an application layer that receives a ph—ph packet in accordance with the present invention. The operations of FIG. 4b operate to generate a second user portion, which is used to test the segmentation/reassembly operations of the SCCP. According to the present embodiment, the second user portion has a structure defined by the second user portion 70 of FIG. 3.

Accordingly, in step 132, the application layer receives a ph—ph packet such as one generated by another application layer in conformity with step 114 of FIG. 4a. Thereafter, in step 134, the application layer generates an SCCP request. An SCCP request is a message protocol defined by the CCITT Recommendations which is used to pass information from an application layer to an SCCP. To generate the request in step 134, the application processor uses the corresponding data in the ph—ph packet to generate the called party field 38, the calling party field 39, and the pointers 35, 36 and 37 of a standard SCCP portion 33 as illustrated in FIG. 2. The called party field 38 is set equal to the Called Party Address Block 56 of the test parameters. The calling party field 39 is set equal to the original called party information passed within the ph—ph packet.

Then, the application layer generates the second user portion 70. In particular, in step 136, the application layer generates an expanded data block of filler data or stuffing which is used as the Data Block 74. The Data Block 74 is expanded such that the entire second user portion 70 (not including the User Part Length Value 71) has a length specified by the Expansion Size 55 in the test parameters. Typically, the Data Block 74 has a length that is three bytes less than identified in the Expansion Size 55 in order to reserve room for the Segmentation Flag 72 and Hash_Sum Value 73. According to the current CCITT Recommendations, the maximum size of the second user portion 70 is 2 kilobytes. In the present embodiment, each byte of the Data Block 74 is given a value specified by the Data Value 54 provided in the ph—ph packet.

In step 138, the application layer inserts the Segmentation Flag 52 into the second user portion 70. Then, in step 140, the application layer calculates the Hash_Sum Value 73. The Hash_Sum Value 73 is a value that is calculated using an algorithm that takes into consideration the size of the Data Block 74 and the value of the data in the Data Block 74. The Hash_Sum Value 73 is inserted into the data block so that the integrity of the data may be verified after segmentation, reassembly, and transmission. Suitable algorithms for such purposes are well known in the art, and the particular hash sum algorithm utilized will typically be a matter of design choice.

In step 140, the application layer sends the request to the SCCP. The request includes a pointer to the second user portion 70 generated in steps 136, 138 and 140, as well as the called party and calling party information generated in step 132. The SCCP may thereafter perform segmentation and operate in conjunction with the MTP to create several XUDT messages, each having a user portion that contains a part of the second user portion 70 generated in steps 136, 138 and 140.

It will be appreciated that a processor programmed in accordance with the flow diagrams in FIGS. 4a and 4b may execute any portion of the segmentation/reassembly test according to the present invention. If most or all signaling nodes in a particular network contain application layer processors programmed in this manner, virtually any conceivable data link between any two nodes of the network may be tested for the integrity of a segmentation, transmission and reassembly process. Of course, if such flexibility is not required, the individual processors may be programmed to perform only a select portion of the operations shown in FIGS. 4a and 4b.

It will further be appreciated that the above described embodiments are merely illustrative. Those of ordinary skill in the art may readily devise other implementations that incorporate the principles of the present invention and fall within the spirit and scope thereof. For example, the division of labor within test configuration of FIG. 1 is given by way of example only. It will be readily apparent to those of ordinary skill in the art that the operations of the first protocol handler 12 and second protocol handler 14 may be performed by a single protocol handler. Moreover, the operations of the third protocol handler 22 may also be performed by either the first protocol handler 12 or second protocol handler 14. In short, multiple parts of the segmentation/reassembly test procedure may be performed by a single protocol handler in a signaling node.

I claim:

1. A method for testing a signaling node comprising at least one message transfer part (MTP), at least one signal connection control part (SCCP), and at least one application layer, said method including:
   a) providing a test signal to a first MTP of the signaling node, the test signal including a first user portion, the first user portion including test parameters;
   b) employing the first MTP and a first SCCP to provide the first user portion of the test signal to the application layer of the signaling node;
   c) causing the application layer to generate a second user portion based on the test parameters;
   d) performing a segmentation operation on the second user portion to generate a plurality of test signal segments, each of the plurality of test signal segments including a user portion segment, such that a sum of the user portion segments includes the second user portion; and
   e) providing the plurality of test signal segments to a protocol handler, said protocol handler operable to provide test results indicative of an integrity of the segmentation operation based on the test signal segments.

2. The method of claim 1 wherein step c) further comprises causing the application layer to generate the second user portion wherein the second user portion includes a data block comprising a quantity of data identified in the test parameters.

3. The method of claim 2 wherein step c) further comprises causing the application layer to generate the second user portion wherein the second user portion includes a verification value, said verification value identifying a measurable quality pertaining to the data block, and wherein step e) further comprises providing the plurality of test signal segments to the protocol handler, the protocol handler being operable to provide the test results using the verification value and the test signal segments.

4. The method of claim 3 wherein step c) further comprises causing the application layer to generate the second user portion including a hash sum, and wherein step e) further comprises providing the plurality of test signal segments to the protocol handler, the protocol handler being operable to provide the test results using the hash sum and the test signal segments.

5. The method of claim 1 wherein step d) further comprises employing a second SCCP to perform the segmentation operation on the second user portion to generate the plurality of test signal segments.

6. The method of claim 5 wherein step e) further comprises providing the plurality of test signal segments to a third SCCP located within the protocol handler, and causing the third SCCP to perform a reassembly operation to reassemble the plurality of test signal segments into a reassembled second user portion, wherein said second node is operable to provide test results indicative of the integrity segmentation operation and an integrity of the reassembly operation based on the reassembled second user portion.

7. A signaling node for use in a communication network, the signaling node comprising:
   a) a message transfer part (MTP) operable to receive a message signal from an external location, the message signal including a user portion, the user portion including test parameters;
   b) a signal connection control part (SCCP) connected to the MTP and operable to receive the message signal therefrom;
   c) an application layer operably connected to receive the test parameters of the message signal from the SCCP, said application layer operable to generate a second user portion based on the test parameters for testing the operation of a second SCCP, said application layer operable to provide the second user portion to the second SCCP.

8. The signaling node of claim 7 wherein the application layer processor is further operable to generate the second user portion for testing a segmentation functionality of the second SCCP.

9. The signaling node of claim 7 wherein the application layer processor is further operable to generate the second user portion for testing a segmentation functionality of the second SCCP and a reassembly functionality of a third SCCP.

10. The signaling node of claim 7 wherein the application layer processor is further operable to generate the second user portion, the second user portion including a data block, the data block having a size identified by the test parameters, the data block further being usable to test the segmentation functionality of the second user portion.

11. The signaling node of claim 10 wherein the application layer processor is further operable to generate the second user portion, the second user portion including a verification value, the verification value identifying an aspect of the data block, said verification value operable to be used by another signaling node to evaluate a segmentation test result.

12. The signaling node of claim 7 wherein the signaling node further comprises the second SCCP, the second SCCP has a segmentation functionality, and the application layer processor is further operable to generate the second user portion for testing the segmentation functionality of the second SCCP.

13. A system for use in a telecommunication network, the telecommunication network including one or more signaling nodes, at least one signaling node including one or more protocol handlers, the system comprising:
   a) a first protocol handler operable to receive a test signal, said test signal including a plurality of test parameters, said first protocol handler operable to forward the test parameters to a second protocol handler to be tested, said second protocol handler to be tested identified by at least one of the plurality of test parameters; and wherein said second protocol handler is operable to
  generate a data block based on one or more of the plurality of test parameters,
  generate a plurality of test signal segments, each of the plurality of test signal segments including a user portion segment, such that the sum of the user portion segments includes the data block, and
  provide the plurality of test signal segments to a third protocol handler, said third protocol handler operable to provide test results based on the test signal segments.

14. The system of claim 13 wherein the second protocol handler is further operable to generate the data block wherein the data block includes a quantity of data identified in the test parameters.

15. The system of claim 13 wherein the second protocol handler is further operable to generate a verification value for inclusion in one of the test signal segments, said verification value identifying a measurable quality pertaining to the data block, and wherein the third protocol handler is operable to provide test results based on the test signal segments including the verification value.

16. A testing arrangement for use in a telecommunication system wherein the telecommunication system is operable to effectuate communication according to the CCITT Signaling System No. 7, the testing arrangement comprising:

a) a first protocol handler including a message transfer part (MTP), a signaling connection control part (SCCP), and an application layer;

b) a message generator operable to generate a formatted data message comprising
    an MTP routing label, the MTP routing label having a data format compatible with the standard Signaling System No. 7 protocol,
    an SCCP portion, the SCCP portion having a data format compatible with the standard Signaling System No. 7 protocol,
    a user portion included within the SCCP portion, the user portion having a data format compatible with the standard Signaling System No. 7 protocol and including data identifying a length of a subsequent user portion to be generated, the subsequent user portion operable to test a segmentation functionality of a protocol handler to be tested, c) a signaling link that operably connects the message generator to the first protocol handler.

17. The testing arrangement of claim 16 wherein the message generator is further operable to generate the formatted data message such that the formatted data message further includes data identifying a value for data used in the generation of the subsequent user portion.

18. The testing arrangement of claim 16 wherein the message generator is further operable to generate the formatted data message such that the formatted data message further includes data identifying the protocol handler to be tested.

19. The testing arrangement of claim 16 wherein the message generator is further operable to generate the formatted data message such that the formatted data message further includes data identifying that subsequent user portion is to be generated.

20. The testing arrangement of claim 16 wherein the message generator is further operable to generate the formatted data message such that the formatted data message further includes:

data identifying a value for data used in the generation of the subsequent user portion;

data identifying the protocol handler to be tested; and data identifying that subsequent user portion is to be generated.

\* \* \* \* \*